US012786835B2

(12) United States Patent
Li

(10) Patent No.: US 12,786,835 B2
(45) Date of Patent: Nov. 3, 2026

(54) COMMUNICATION METHOD AND COMMUNICATION APPARATUS IN NON-STANDALONE NSA MODE, AND ELECTRONIC DEVICE

(71) Applicant: VIVO MOBILE COMMUNICATION CO., LTD., Guangdong (CN)

(72) Inventor: Zhonghuang Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 279 days.

(21) Appl. No.: 18/598,352

(22) Filed: Mar. 7, 2024

(65) Prior Publication Data

US 2024/0214901 A1 Jun. 27, 2024

Related U.S. Application Data

(63) Continuation of application No. PCT/CN2022/117374, filed on Sep. 6, 2022.

(30) Foreign Application Priority Data

Sep. 8, 2021 (CN) ........................ 202111050806.8

(51) Int. Cl.
*H04W 36/30* (2009.01)
*H04W 36/08* (2009.01)

(52) U.S. Cl.
CPC ......... *H04W 36/305* (2018.08); *H04W 36/08* (2013.01)

(58) Field of Classification Search
CPC ............................ H04W 36/305; H04W 36/08
See application file for complete search history.

(56) References Cited

U.S. PATENT DOCUMENTS

| | | | | |
|---|---|---|---|---|
| 11,172,412 | B2 * | 11/2021 | Bae | H04B 1/401 |
| 11,234,154 | B2 * | 1/2022 | Yang | H04W 24/10 |
| 2011/0077004 | A1 * | 3/2011 | Aoyagi | H04W 48/08 455/434 |

(Continued)

FOREIGN PATENT DOCUMENTS

| | | |
|---|---|---|
| CN | 106413011 A | 2/2017 |
| CN | 110582128 A | 12/2019 |

(Continued)

*Primary Examiner* — Chandrahas B Patel
(74) *Attorney, Agent, or Firm* — Price Heneveld LLP

(57) ABSTRACT

This application discloses a communication method and a communication apparatus in an NSA mode, and an electronic device. The communication method includes: detecting communication quality of a 5G communication service of a mobile terminal in a first cell, where the mobile terminal supports a 5G capability in the non-standalone NSA mode and reports 5G capability support to the first cell; if the communication quality of the 5G communication service is less than a preset indicator, detecting an abnormality of the 5G communication service in the first cell; if the abnormality exists in the 5G communication service in the first cell, obtaining, from an available neighboring cell corresponding to the first cell, a second cell supporting the 5G communication service; and when the second cell exists, handing over an access cell of the mobile terminal from the first cell to the second cell and reporting the 5G capability support.

20 Claims, 6 Drawing Sheets

(56) References Cited

U.S. PATENT DOCUMENTS

| | | | | |
|---|---|---|---|---|
| 2014/0071943 | A1* | 3/2014 | Lee | H04W 36/38 370/328 |
| 2020/0145835 | A1 | 5/2020 | Xu et al. | |
| 2022/0345955 | A1 | 10/2022 | Lin et al. | |
| 2023/0345327 | A1 | 10/2023 | Luo et al. | |

FOREIGN PATENT DOCUMENTS

| | | | |
|---|---|---|---|
| CN | 110708733 | A | 1/2020 |
| CN | 110856226 | A | 2/2020 |
| CN | 110868746 | A | 3/2020 |
| CN | 111328119 | A | 6/2020 |
| CN | 111954278 | A | 11/2020 |
| CN | 110944369 | B | 2/2021 |
| CN | 112738856 | A | 4/2021 |
| CN | 108696881 | B | 6/2021 |
| CN | 113038545 | A | 6/2021 |
| WO | 2018205965 | A1 | 11/2018 |
| WO | 2021115423 | A1 | 6/2021 |

* cited by examiner

COMMUNICATION METHOD AND COMMUNICATION APPARATUS IN NON-STANDALONE NSA MODE, AND ELECTRONIC DEVICE

CROSS-REFERENCE TO RELATED APPLICATIONS

This application is a Bypass Continuation Application of PCT International Application No. PCT/CN2022/117374 filed on Sep. 6, 2022, which claims priority to Chinese Patent Application No. 202111050806.8, filed with the China National Intellectual Property Administration on Sep. 8, 2021 and entitled "COMMUNICATION METHOD AND COMMUNICATION APPARATUS IN NON-STANDALONE NSA MODE, AND ELECTRONIC DEVICE", which are incorporated herein by reference in their entireties.

TECHNICAL FIELD

This application belongs to the communications field, and specifically, to a communication method and a communication apparatus in a non-standalone NSA mode, and an electronic device.

BACKGROUND

With popularization and popularity of 5G technologies, non-standalone (NSA) has developed rapidly in an early stage to quickly deploy 5G networks. NSA is a joint network of LTE and NR. Signaling works on LTE and data is carried partially or entirely by NR. To quickly promote NSA network deployment, an LTE anchor base station is newly built, and some LTE base stations are transformed into LTE anchor base stations, to support 5G communication of a mobile terminal by using the LTE anchor base stations.

However, some newly built or transformed LTE anchor base stations have a network optimization defect. When the mobile terminal is prone to abnormal 5G communication on the LTE base stations, resulting in a communication interruption or a communication lag.

SUMMARY

An objective of embodiments of this application is to provide a communication method and a communication Apparatus in an NSA mode, and an electronic device.

According to a first aspect, an embodiment of this application provides a communication method in a non-standalone NSA mode, where the method includes: detecting communication quality of a 5G communication service of a mobile terminal in a first cell, where the mobile terminal supports a 5G capability in the non-standalone NSA mode and reports 5G capability support to the first cell;

- if the communication quality of the 5G communication service is less than a preset indicator, detecting an abnormality of the 5G communication service in the first cell;
- if the abnormality exists in the 5G communication service in the first cell, obtaining, from an available neighboring cell corresponding to the first cell, a second cell supporting the 5G communication service; and
- when the second cell exists, handing over an access cell of the mobile terminal from the first cell to the second cell and reporting the 5G capability support.

According to a second aspect, an embodiment of this application provides a communication method in a non-standalone NSA mode, where the method includes: detecting communication quality of a 5G communication service of a mobile terminal in a first cell, where the mobile terminal supports a 5G capability in the non-standalone NSA mode and reports 5G capability support to the first cell;

- if the communication quality of the 5G communication service is less than a preset indicator, detecting an abnormality of the 5G communication service in the first cell;
- if the abnormality exists in the 5G communication service in the first cell, disabling the 5G capability support of the mobile terminal and performing reporting to the first cell; and
- handing over the 5G capability support of the mobile terminal to 4G capability support.

According to a third aspect, an embodiment of this application provides a communication apparatus in a non-standalone NSA mode, where the apparatus includes:

- a first detection module, configured to detect communication quality of a 5G communication service of a mobile terminal in a first cell, where the mobile terminal supports a 5G capability in the non-standalone NSA mode and reports 5G capability support to the first cell;
- a second detection module, configured to: if the communication quality of the 5G communication service is less than a preset indicator, detect an abnormality of the 5G communication service in the first cell;
- an obtaining module, configured to: if the abnormality exists in the 5G communication service in the first cell, obtain, from an available neighboring cell corresponding to the first cell, a second cell supporting the 5G communication service; and
- a first handover module, configured to: when the second cell exists, hand over an access cell of the mobile terminal from the first cell to the second cell and report the 5G capability support.

According to a fourth aspect, an embodiment of this application provides a communication apparatus in a non-standalone NSA mode, where the apparatus includes:

- a first detection module, configured to detect communication quality of a 5G communication service of a mobile terminal in a first cell, where the mobile terminal supports a 5G capability in the non-standalone NSA mode and reports 5G capability support to the first cell;
- a second detection module, configured to: if the communication quality of the 5G communication service is less than a preset indicator, detect an abnormality of the 5G communication service in the first cell;
- a disabling module, configured to: if the abnormality exists in the 5G communication service in the first cell, disable the 5G capability support of the mobile terminal and perform reporting to the first cell; and
- a handover module, configured to hand over the 5G capability support of the mobile terminal to 4G capability support.

According to a fifth aspect, an embodiment of this application provides an electronic device, where the electronic device includes a processor, a memory, and a program or an instruction stored in the memory and capable of running on the processor, and when the program or the instruction is executed by the processor, the steps of the method according to the first aspect or the second aspect are implemented.

According to a sixth aspect, an embodiment of this application provides a readable storage medium, where the readable storage medium stores a program or an instruction, and when the program or the instruction is executed by the processor, the steps of the method according to the first aspect or the second aspect are implemented.

According to a seventh aspect, an embodiment of this application provides a chip, where the chip includes a processor and a communication interface, where the communication interface is coupled to the processor, and the processor is configured to run a program or an instruction to implement the method according to the first aspect or the second aspect.

DESCRIPTION OF EMBODIMENTS

The following clearly describes technical solutions in the embodiments of this application with reference to accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to the accompanying drawings, the communication method in a non-standalone NSA mode provided in the embodiments of this application is described below in detail by using specific embodiments and application scenarios of the embodiments.

Figure 1:
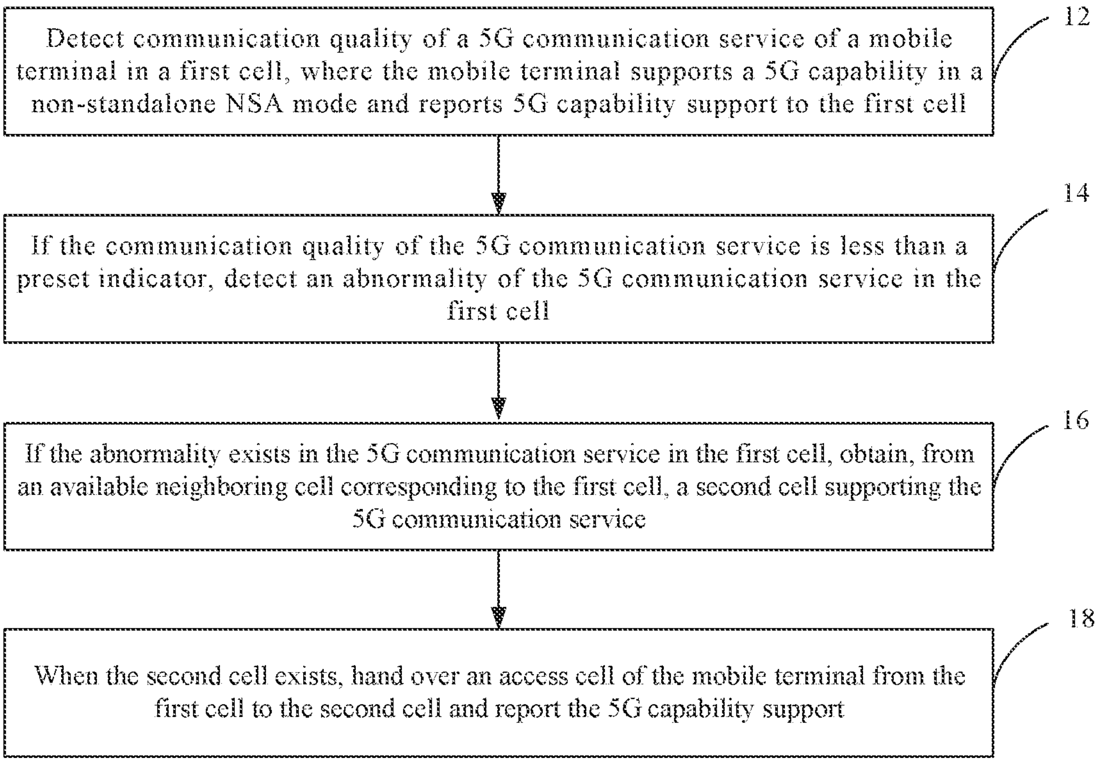
FIG. 1 is one of schematic flowcharts of a communication method in an NSA mode according to an embodiment of this application.

In an embodiment of this application, a communication method in an NSA mode is provided. The method may be performed by a mobile terminal. FIG. 1 is a schematic flowchart of a communication method in an NSA mode according to an embodiment of this application.

As shown in FIG. 1, the communication method in the NSA mode in this embodiment of this application includes the following step 12 to step 18.

Step 12: Detect communication quality of a 5G communication service of the mobile terminal in a first cell, where the mobile terminal supports a 5G capability in the NSA mode and reports 5G capability support to the first cell.

When the mobile terminal supports the 5G capability in the NSA mode and reports the 5G capability to a corresponding cell A, when the access cell A is an anchor cell, if the mobile terminal is turned on, gets online, and registers with the cell A, the mobile terminal can perform 5G service communication in the cell A.

When the cell A provides the 5G communication service for the mobile terminal, communication quality of the 5G communication service provided by the cell A to the mobile terminal needs to be detected, to determine whether an LTE anchor base station corresponding to the cell A has a communication abnormality.

Figure 2:
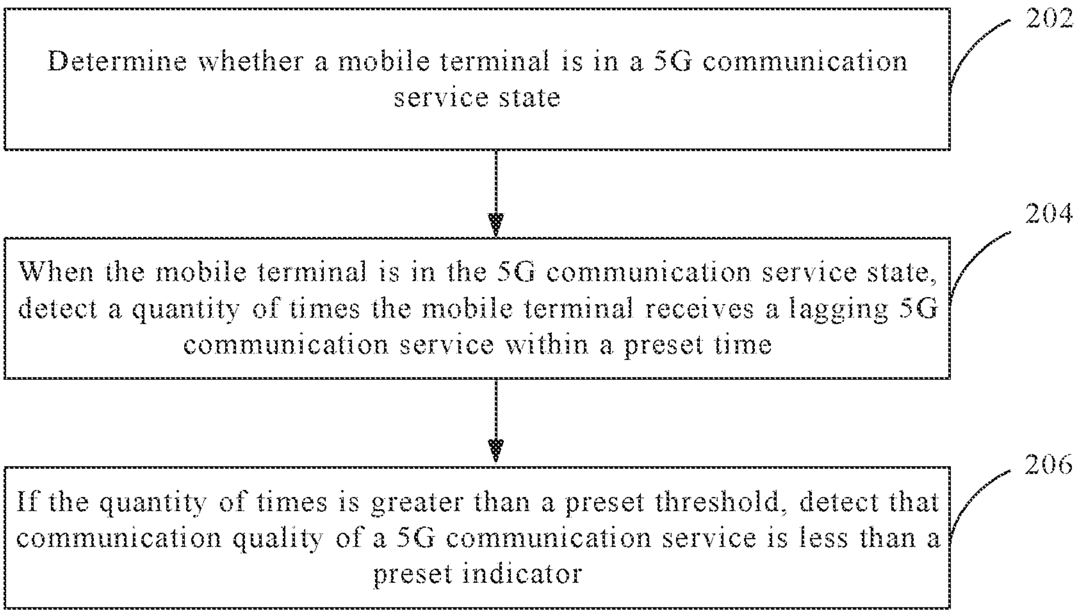
FIG. 2 is one of schematic flowcharts of a communication method in an NSA mode according to an embodiment of this application.

Optionally, as shown in FIG. 2, the detecting the communication quality of the 5G communication service of the mobile terminal in the first cell includes step 202 to step 206.

Step 202: Determine whether the mobile terminal is in a 5G communication service state.

To determine whether the mobile terminal is in the service state, it may be checked whether more than N1 applications simultaneously use a data network in a background of the mobile terminal, or whether an overall network speed of the mobile terminal is above N2 kB/s. N1 and N2 are corresponding threshold values, and are stored in a memory medium of the mobile terminal. The values of N1 and N2 may be appropriately adjusted based on different scenarios, such as a video scenario, a game scenario, and a browser scenario. In an embodiment, the value of N1 ranges between 2 and 4, and is generally set to 3; and the value of N2 ranges between 80 and 120, and is generally set to 100.

Step 204: When the mobile terminal is in the 5G communication service state, detect a quantity of times the mobile terminal receives a lagging 5G communication service within a preset time.

Whether the current 5G communication service is lagging or unsmooth is determined, to detect the communication quality of the 5G communication service between the mobile terminal and the cell A. For example, the mobile terminal checks whether the communication service received N3 or more times within T1 seconds is lagging or unsmooth.

T1 is a corresponding threshold value, and is stored in the memory medium of the mobile terminal. The value of T1 may be appropriately adjusted based on different scenarios. In an embodiment, the value of T1 ranges between 20 and 40, and is generally set to 30.

Step 206: If the quantity of times is greater than a preset threshold, detect that the communication quality of the 5G communication service is less than a preset indicator.

If the condition is met, it indicates that the communication quality of the current 5G communication service is less than the preset indicator, and the communication quality is poor. Subsequently, proceed to step 14 to further detect an abnormality in the cell A. This is specifically described below.

If the mobile terminal checks that the quantity of times the communication service received within T1 seconds is lagging or unsmooth is less than N3, it indicates that the communication quality of the current 5G communication service is qualified, and the cell A can continue to provide the 5G communication service for the mobile terminal.

Step 14: If the communication quality of the 5G communication service is less than the preset indicator, detect an abnormality of the 5G communication service in the first cell.

As described above, if it is detected in step 12 that the communication quality of the current 5G communication service is poor, abnormality needs to be detected in the cell A to detect whether an anchor base station corresponding to the cell A is an abnormal base station.

Optionally, in an embodiment, detecting the abnormality of the 5G communication service in the first cell includes: determining whether the first cell responds to a data transmission request of the mobile terminal; and when the first cell does not respond to the data transmission request of the terminal, detecting that the abnormality exists in the 5G communication service in the first cell.

For example, the mobile terminal consecutively sends more than N4 uplink data packets within T2 seconds, but receives no downlink data packet sent by a base station, that is, a network does not respond to the data transmission request of the terminal.

T2 and N4 are corresponding threshold values, and are stored in the memory medium of the mobile terminal. The values of T2 and N4 may be appropriately adjusted based on different scenarios. In an embodiment, the value of T2 ranges between 5 and 15, and is generally set to 10; and the value of N4 ranges between 4 and 8, and is generally set to 6.

In this embodiment, the network of the base station sends no response to data sent by the mobile terminal, thereby causing an interruption or a lag of 5G communication of the mobile terminal, resulting in poor communication quality of the 5G communication service.

Optionally, in an embodiment, detecting the abnormality of the 5G communication service in the first cell includes: determining whether packet data convergence protocol PDCP sequence numbers of the first cell are consecutive; and when the PDCP sequence numbers are inconsecutive, detecting that the abnormality exists in the 5G communication service in the first cell.

The base station configures a main cell group (MCG) bearer on a new radio (NR) packet data convergence protocol (PDCP), and configures a PDCP sequence number as 18 bits. PDCP sequence numbers must be consecutive to correctly transmit data. The PDCP sequence numbers greatly jump, indicating that the base station is incompatible with a configuration that an NR PDCP sequence number is 18 bits. In some scenarios, for example, during a handover, incompatibility causes the mobile terminal and the base station to have inconsistent understanding of the PDCP sequence number of 18 bits. Consequently, inconsistent PDCP sequence numbers cause an interruption of data transmission of 5G communication.

In this embodiment, because the base station sends a data packet with an incorrect PDCP sequence number to the mobile terminal, the mobile terminal cannot parse out the data packet, causing an interruption or a lag of 5G communication of the mobile terminal, resulting in poor communication quality of the 5G communication service.

In the foregoing embodiment, a reason why the communication quality of the 5G communication service between the cell A and the mobile terminal is poor may be that a conflicting base station corresponding to the cell A causes a 5G communication abnormality due to imperfect network optimization.

Therefore, in an embodiment, before the abnormality of the 5G communication service in the cell A is detected, the method may further include: first determining whether the cell A is an abnormal cell.

Figure 3:
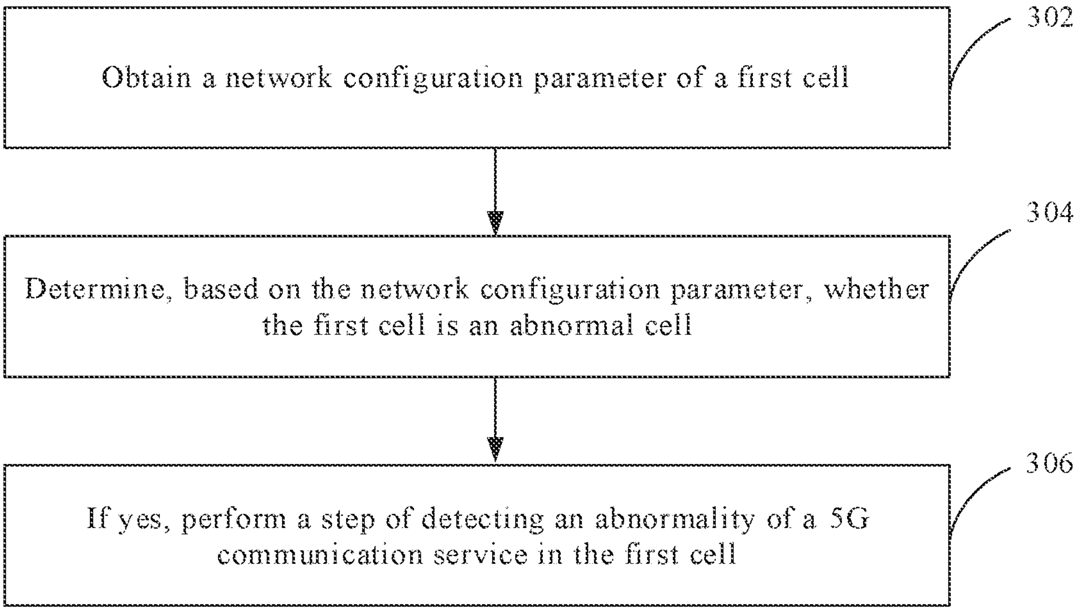
FIG. 3 is one of schematic flowcharts of a communication method in an NSA mode according to an embodiment of this application.

As shown in FIG. 3, the following step 302 to step 306 are included. Step 302: Obtain a network configuration parameter of the first cell.

The network configuration parameter includes, for example, a PDCP sequence number corresponding to the cell, NR measurement, and NSA mode registration of the mobile terminal.

Step 304: Determine, based on the network configuration parameter, whether the first cell is the abnormal cell.

First, it is determined whether a PDCP entity of the first cell is configured in an NR mode or whether the PDCP sequence number meets a preset format. For example, the PDCP sequence number is 18 bits.

If the PDCP entity of the first cell is configured in the NR mode, and the PDCP sequence number meets the preset format, it is determined whether the first cell is configured with NR measurement or whether the mobile terminal registers the NSA mode with the first cell.

If the first cell is not configured with the NR measurement and the mobile terminal does not register the NSA mode with the first cell, it is determined that the first cell is the abnormal cell.

If the mobile terminal cannot register the NSA mode with the cell A, the mobile terminal cannot be connected to the cell A.

If the cell A is not configured with NR 5G neighboring cell measurement, neighboring cell measurement cannot be performed. Without measurement, the mobile terminal cannot be connected to the cell A to implement 5G communication.

Therefore, if the cell is not configured with NR measurement, and the mobile terminal does not successfully register the NSA mode with the cell, it indicates that the cell is an abnormal cell, a corresponding base station is an abnormal base station, and the cell cannot normally provide the 5G communication service to the mobile terminal that supports the 5G capability and performs reporting.

Step 306: If yes, perform the step of detecting an abnormality of the 5G communication service in the first cell.

Therefore, the mobile terminal may perform cell abnormality detection based on a cell configuration and network transmission, thereby accurately detecting the abnormality of the 5G communication service in the first cell.

Step 16: If the abnormality exists in the 5G communication service in the first cell, obtain, from an available neighboring cell corresponding to the first cell, a second cell supporting the 5G communication service.

A definition of an available neighboring cell B is: The mobile terminal may register with B for normal communication, that is, a public land mobile network (PLMN) of the cell B meets a requirement, and no abnormality is detected in the cell B. In addition, a signal of the cell B meets a standard. The signal includes, for example, a reference signal received power (RSRP), an LTE reference signal received quality (RSRQ), and a signal-to-noise ratio (SNR). The RSRP>an RSRP_th. The RSRQ>an RSRQ_th. The SNR>an SNR_th.

The RSRP_th, the RSRQ_th, and the SNR_th are corresponding threshold values, and are stored in a memory medium of the mobile terminal. The values of the RSRP_th, the RSRQ_th, and the SNR_th may be appropriately adjusted based on different scenarios. In an embodiment, the value of RSRP_th ranges between −120 and −95, and is generally set to −105. The value of RSRG_th ranges between −16 and −8, and is generally set to −12. The value of SNR_th is 0.

Optionally, after the second cell supporting the 5G communication service is obtained from the available neighboring cell corresponding to the first cell, the method further includes: if the mobile terminal camps on the first cell, triggering a connected-state radio link failure, or getting offline in an idle state and re-registering with the second cell, to prohibit the mobile terminal from registering with the first cell.

That is, the mobile terminal disables the cell A within a time period. After the mobile terminal registers with the cell B, a measurement report of the cell A may be shielded in a connected state, and the cell A is not reselected in the idle state.

The time period may be 5 minutes to 20 minutes, and is generally set to 10 minutes.

Step 18: When the second cell exists, hand over an access cell of the mobile terminal from the first cell to the second cell and report the 5G capability support.

Therefore, when existence of the abnormality of 5G communication between the mobile terminal and the cell A is detected, the access cell of the mobile terminal is handed over to a neighboring cell B that can normally support 5G communication, so that an interruption and a lag of long-term communication of the mobile terminal can be avoided and a normal communication service of the mobile terminal is ensured, thereby improving smoothness of 5G communication in the NSA mode.

In an embodiment, if the second cell or the available neighboring cell does not exist, the 5G capability support of the mobile terminal is disabled and reporting to the first cell is performed.

After the mobile terminal disables the 5G capability and performs reporting, the cell A neither queries for the 5G capability of the mobile terminal, nor is configured with an NR PDCP. Therefore, no 5G communication abnormality problem occurs on such an abnormal base station.

To avoid an interruption of the communication service of the mobile terminal, optionally, in an embodiment, the method further includes: handing over the 5G capability support of the mobile terminal to 4G capability support.

An abnormality occurs when the cell A provides the 5G communication service. However, a communication service in another mode, such as 2G/3G/4G, is normal. Therefore, when an abnormality exists during 5G communication, the mobile terminal is handed over to 4G capability support, and the cell A may continue to provide an uninterrupted communication service for the mobile terminal, thereby ensuring that the communication service of the mobile terminal is normal.

In an embodiment, when the mobile terminal leaves the first cell, it is determined whether leaving duration exceeds second preset duration; and if yes, the 5G capability support of the mobile terminal is enabled and is reported to a corresponding access cell.

For example, the mobile terminal determines whether the mobile terminal has left the cell A for more than T4 seconds; and if yes, determines that the mobile terminal has been disconnected from a communication connection to the abnormal cell A. In this case, the 5G capability support of the mobile terminal needs to be enabled again and reported to the access cell, to obtain a normal 5G communication service of the access cell.

T4 is a corresponding threshold value, and is stored in the memory medium of the mobile terminal. The value of T4 may be appropriately adjusted based on different scenarios. In an embodiment, the value of T4 ranges between 20 and 40, and is generally set to 30.

In this embodiment of this application, the communication quality of the 5G communication service of the mobile terminal in the access cell is first detected; when the communication quality is less than the preset indicator, the 5G communication service in the cell is further detected; and when the 5G communication service in the cell is abnormal, another cell that also supports the 5G communication service is obtained and a handover is performed to the another cell. Therefore, when LTE network communication in an NSA anchor cell is abnormal, a specific abnormality of a specific base station can be accurately identified, and the abnormal cell can be left in a timely manner and a handover is performed to a cell in which normal 5G communication can be performed, to avoid a service delay or a service interruption and improve communication fluency in the NSA mode. Accordingly, stability and user experience of the communication service of the mobile terminal are improved.

In addition, the 5G capability support of the mobile terminal is enabled and disabled, so that a configuration of an abnormal base station can be effectively adjusted, to provide a stable and reliable communication service for the mobile terminal.

Figure 4:
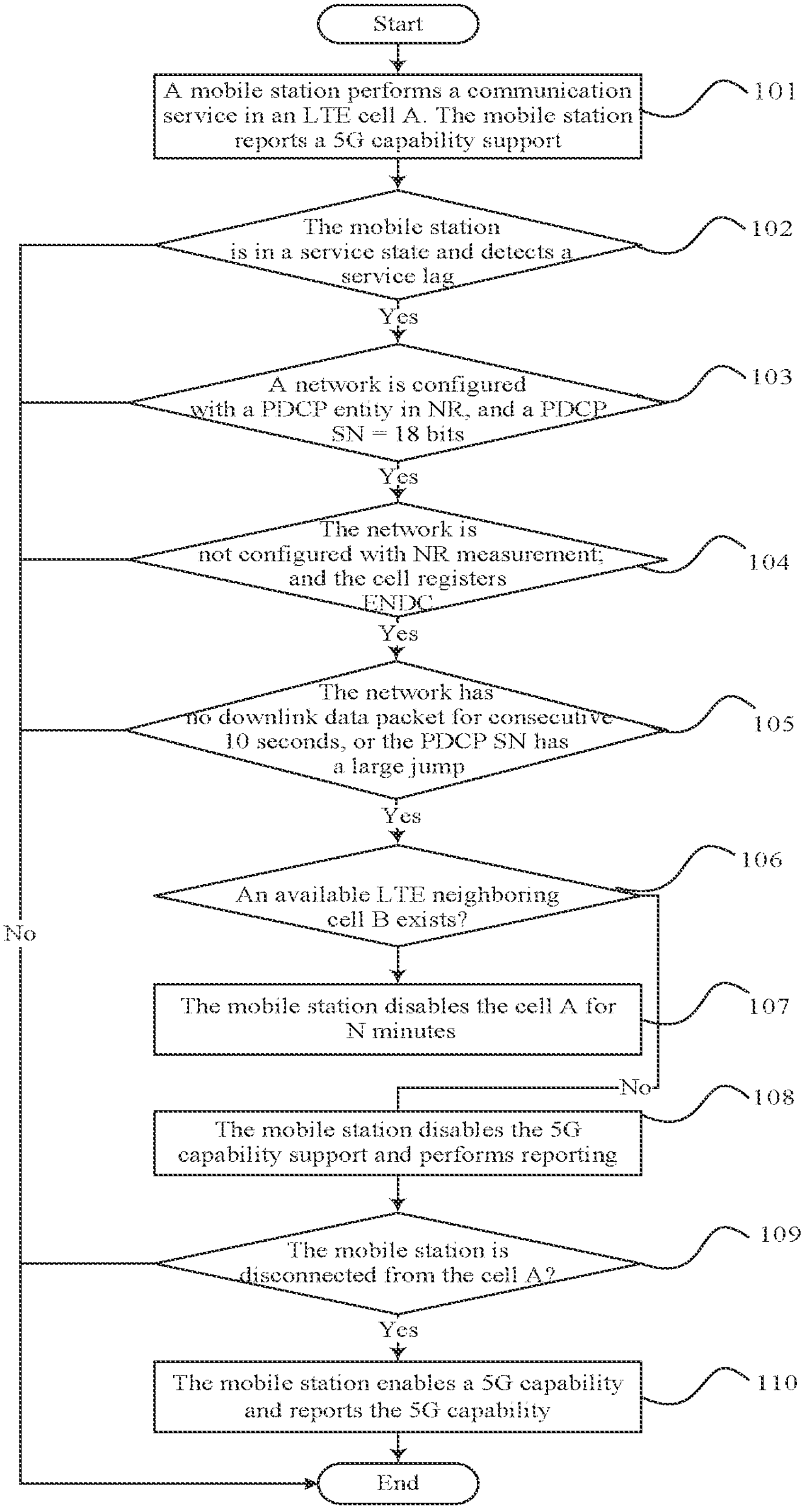
FIG. 4 is an example of an entire procedure of a communication method in an NSA mode according to an embodiment of this application.

FIG. 4 is an example of an entire procedure of a communication method in an NSA mode according to an embodiment of this application. In this embodiment, a mobile terminal is a mobile station.

As shown in the figure, the following steps are included:

Step 101: The mobile station performs a communication service in an LTE cell, and the mobile station reports 5G capability support.

Step 102: Determine whether the mobile station is in a service state and whether a service lag is detected. If yes, proceed to step 103; or if not, end.

Step 103: Determine whether a cell network is configured with a PDCP entity in NR and whether a PDCP SN (PDCP sequence number) is equal to 18 bits. If yes, proceed to step 104; or if not, end.

Step 104: Determine whether the cell network is configured with NR measurement or whether a cell A registers LTE and NR dual connectivity (E-UTRA NR Dual Connectivity, ENDC), that is, the cell A registers LTE and NR dual connectivity; and if the cell network is not configured with the NR measurement and the cell A does not register the NSA mode, proceed to step 105; or if not, end.

Step 105: Determine whether the cell network has no downlink data packet for 10 consecutive seconds, or whether the PDCP SN has a large jump; and if so, proceed to step 106; or if not, end.

Step 106: Determine whether there is an available LTE neighboring cell B; and if yes, proceed to step 107; or if not, proceed to step 108.

Step 107: The mobile station disables the cell A for N minutes; and after N minutes, the mobile station enables the cell A.

Step 108: The mobile station disables the 5G capability support and performs reporting to the cell A.

Step 109: Determine whether the mobile station is disconnected from the cell A; and if so, proceed to step 110; or if not, end.

Step 110: The mobile station enables a 5G capability and reports the 5G capability.

Figure 5:
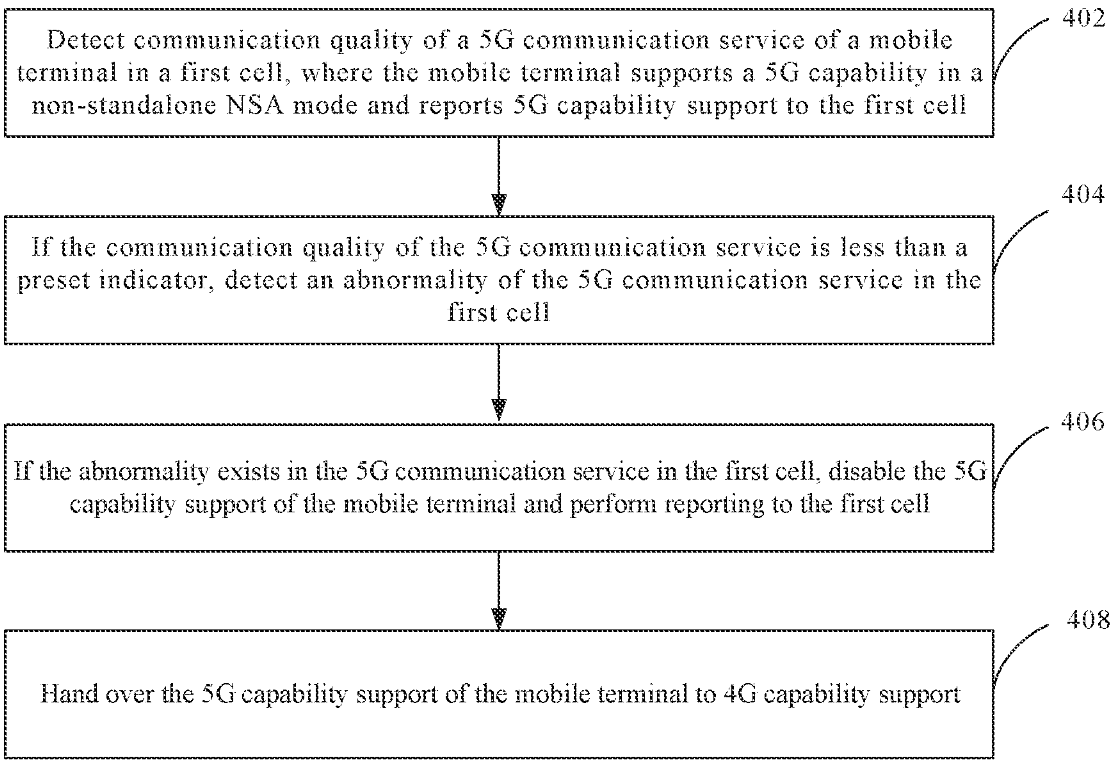
FIG. 5 is a schematic flowchart of a communication method in an NSA mode according to another embodiment of this application.

Optionally, an embodiment of this application further provides a communication method in a non-standalone NSA mode. As shown in FIG. 5, the following steps are included:

Step 402: Detect communication quality of a 5G communication service of a mobile terminal in a first cell, where the mobile terminal supports a 5G capability in the non-standalone NSA mode and reports 5G capability support to the first cell.

Step 404: If the communication quality of the 5G communication service is less than a preset indicator, detect an abnormality of the 5G communication service in the first cell.

Step 406: If the abnormality exists in the 5G communication service in the first cell, disable the 5G capability support of the mobile terminal and perform reporting to the first cell.

Step 408: Hand over the 5G capability support of the mobile terminal to 4G capability support.

In this embodiment of this application, communication quality of a 5G communication service of the mobile terminal in an access cell is first detected; when the communication quality is less than the preset indicator, the 5G communication service in the cell is further detected; and when the 5G communication service in the cell is abnormal, supporting 5G is directly stopped and a handover is performed to 4G communication. Therefore, when LTE network communication in an NSA anchor cell is abnormal, a specific abnormality of a specific base station can be accurately identified, and 5G communication in an abnormal cell is handed over to normal 4G communication in a timely manner, to avoid a service delay or a service interruption and improve stability and user experience of the communication service of the mobile terminal.

It should be noted that the communication method in the NSA mode provided in this embodiment of this application may be performed by a communication apparatus in the NSA mode. In an embodiment of this application, the communication apparatus in the NSA mode provided in embodiments of this application is described by using an example in which the communication method in the NSA mode is performed by the communication apparatus in the NSA mode.

Figure 6:
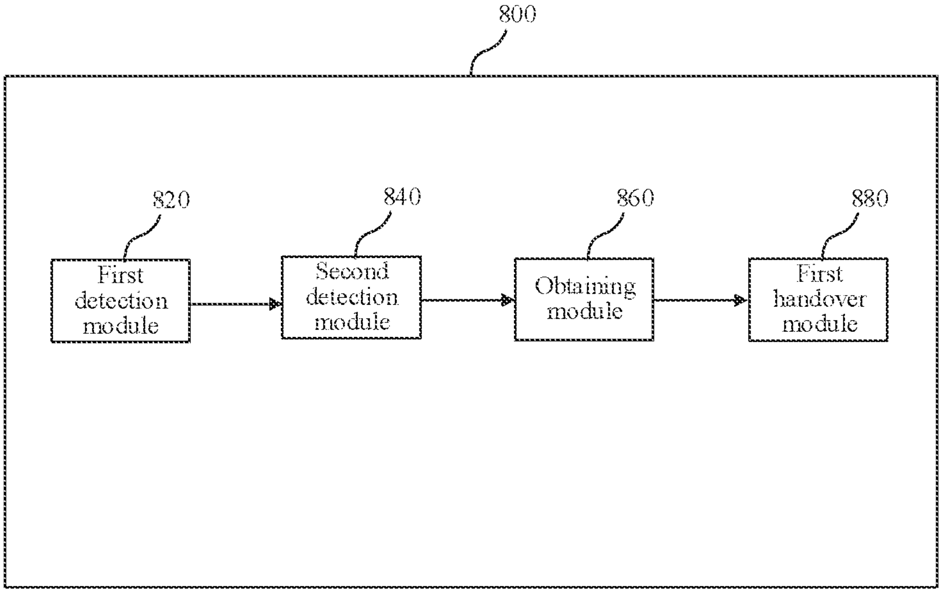
FIG. 6 is a structural block diagram of a communication apparatus in an NSA mode according to a first embodiment of this application.

In an embodiment of this application, a communication apparatus in a non-standalone NSA mode is provided. As shown in FIG. 6, the communication apparatus 800 includes:

a first detection module 820, configured to detect communication quality of a 5G communication service of a mobile terminal in a first cell, where the mobile terminal supports a 5G capability in the non-standalone NSA mode and reports 5G capability support to the first cell;

a second detection module 840, configured to: if the communication quality of the 5G communication service is less than a preset indicator, detect an abnormality of the 5G communication service in the first cell;

an obtaining module 860, configured to: if the abnormality exists in the 5G communication service in the first cell, obtain, from an available neighboring cell corresponding to the first cell, a second cell supporting the 5G communication service; and a first handover module 880, configured to: when the second cell exists, hand over an access cell of the mobile terminal from the first cell to the second cell and report the 5G capability support.

Optionally, the first detection module 820 is specifically configured to:

determine whether the mobile terminal is in a 5G communication service state;

when the mobile terminal is in the 5G communication service state, detect a quantity of times the mobile terminal receives a lagging 5G communication service within a preset time; and if the quantity of times is greater than a preset threshold, detect that the communication quality of the 5G communication service is less than the preset indicator.

Optionally, the second detection module 840 is specifically configured to:

determine whether the first cell responds to a data transmission request of the mobile terminal; and when the first cell does not respond to the data transmission request of the terminal, detect that the abnormality exists in the 5G communication service in the first cell.

Optionally, the second detection module 840 is specifically configured to:

determine whether packet data convergence protocol PDCP sequence numbers of the first cell are consecutive; and when the PDCP sequence numbers are inconsecutive, detect that the abnormality exists in the 5G communication service in the first cell.

Optionally, a third detection module (not shown in the figure) is further included, and is specifically configured to:

before the second detection module detects the abnormality of the 5G communication service in the first cell, obtain a network configuration parameter of the first cell; and determine, based on the network configuration parameter, whether the first cell is an abnormal cell; and if yes, the second detection module performs the step of detecting an abnormality of the 5G communication service in the first cell.

Optionally, that the third detection module determines, based on the network configuration parameter, whether the first cell is an abnormal cell specifically includes:

determining whether a PDCP entity of the first cell is configured in a new radio NR mode or whether the PDCP sequence number meets a preset format;

if the PDCP entity of the first cell is configured in the NR mode and the PDCP sequence number meets the preset format, determining whether the first cell is configured with NR measurement or whether the mobile terminal registers the NSA mode with the first cell; and if the first cell is not configured with the NR measurement and the mobile terminal does not register the NSA mode with the first cell, determining that the first cell is the abnormal cell.

Optionally, a prohibition module (not shown in the figure) is further included, and is specifically configured to:

after the obtaining module obtains, from the available neighboring cell corresponding to the first cell, the second cell supporting the 5G communication service, if the mobile terminal camps on the first cell, trigger a connected-state radio link failure, or get offline in an idle state and re-register with the second cell, to prohibit the mobile terminal from registering with the first cell.

Optionally, a disabling module (not shown in the figure) is further included, and is specifically configured to:

if the second cell or the available neighboring cell does not exist, disable the 5G capability support of the mobile terminal and perform reporting to the first cell.

Optionally, a second handover module (not shown in the figure) is further included, and is specifically configured to:

hand over the 5G capability support of the mobile terminal to 4G capability support.

Optionally, an enabling module (not shown in the figure) is further included, and is specifically configured to:

when the mobile terminal leaves the first cell, determine whether leaving duration exceeds second preset duration; and if yes, enable the 5G capability support of the mobile terminal and report the 5G capability support to a corresponding access cell.

In this embodiment of this application, the communication quality of the 5G communication service of the mobile terminal in the access cell is first detected; when the communication quality is less than the preset indicator, the 5G communication service in the cell is further detected; and when the 5G communication service in the cell is abnormal, another cell that also supports the 5G communication service is obtained and a handover is performed to the another cell. Therefore, when LTE network communication in an NSA anchor cell is abnormal, a specific abnormality of a specific base station can be accurately identified, and the abnormal cell can be left in a timely manner and a handover is performed to a cell in which normal 5G communication can be performed, to avoid a service delay or a service interruption and improve communication fluency in the NSA mode. Accordingly, stability and user experience of the communication service of the mobile terminal are improved.

The communication apparatus in the NSA mode provided in this embodiment of this application can implement each process implemented based on the method embodiments in FIG. 1 to FIG. 4. To avoid repetition, details are not described herein again.

Figure 7:
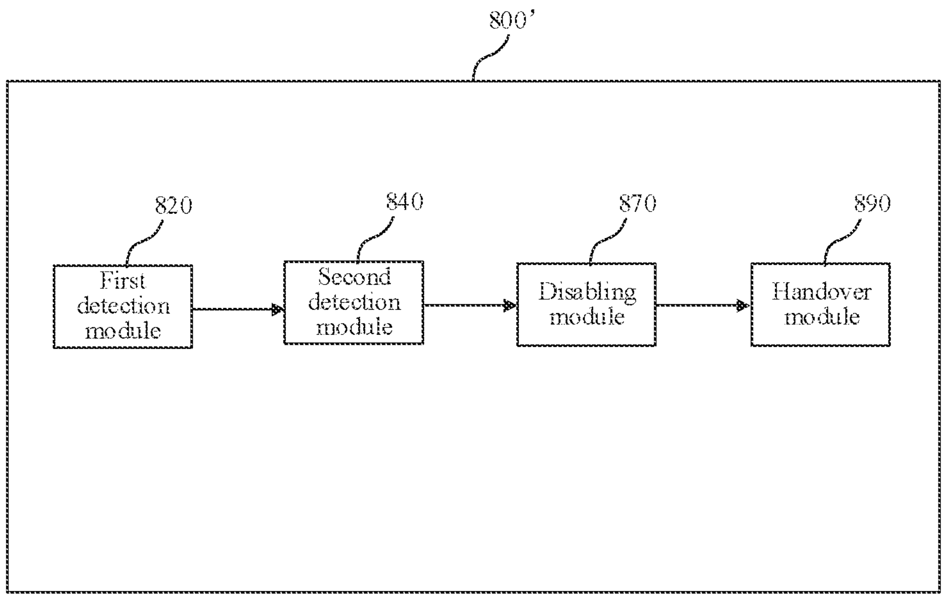
FIG. 7 is a structural block diagram of a communication apparatus in an NSA mode according to a second embodiment of this application.

In another embodiment of this application, a communication apparatus in a non-standalone NSA mode is provided. As shown in FIG. 7, the communication apparatus 800 includes:

a first detection module 820, configured to detect communication quality of a 5G communication service of a mobile terminal in a first cell, where the mobile terminal supports a 5G capability in the non-standalone NSA mode and reports 5G capability support to the first cell;

a second detection module 840, configured to: if the communication quality of the 5G communication service is less than a preset indicator, detect an abnormality of the 5G communication service in the first cell;

a disabling module 870, configured to: if the abnormality exists in the 5G communication service in the first cell, disable the 5G capability support of the mobile terminal and perform reporting to the first cell; and a handover module 890, configured to hand over the 5G capability support of the mobile terminal to 4G capability support.

The first detection module and the second detection module in this embodiment are the same as the first detection module and the second detection module in the embodiment in FIG. 6.

The communication apparatus in the NSA mode provided in this embodiment of this application can implement each process in the method embodiment in FIG. 5. To avoid repetition, details are not described herein again.

The communication apparatus in the NSA mode in this embodiment of this application may be an apparatus, or may be a component, an integrated circuit, or a chip in a terminal. The apparatus may be a mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, or a personal digital assistant (PDA). This is not specifically limited in this embodiment of this application.

The communication apparatus in the NSA mode in this embodiment of this application may be an apparatus with an operating system. The operating system may be an Android operating system, an iOS operating system, or another possible operating system. This is not specifically limited in the embodiments of this application.

The communication apparatus in the NSA mode provided in this embodiment of this application can implement each process implemented in the method embodiments in FIG. 1 to FIG. 5. To avoid repetition, details are not described herein again.

Figure 8:
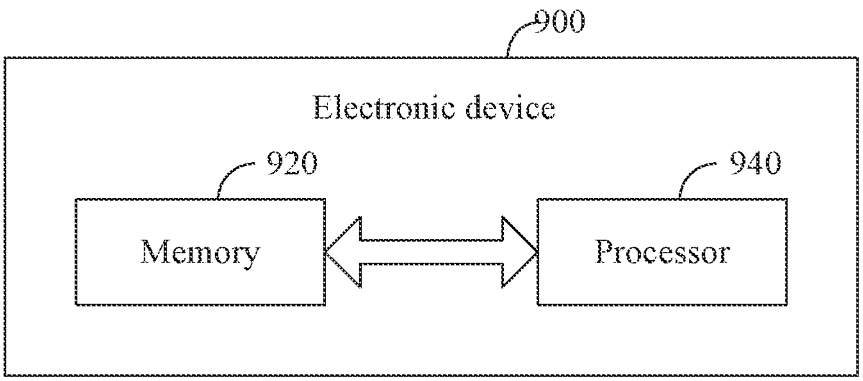
FIG. 8 is a structural block diagram of an electronic device according to an embodiment of this application.

Optionally, as shown in FIG. 8, an embodiment of this application further provides an electronic device 900, including a processor 940, a memory 920, and a program or an instruction stored in the memory 920 and capable of running on the processor 940. When the program or the instruction is executed by the processor 940, each process of the foregoing embodiment of the communication method in the NSA mode is implemented and a same technical effect can be achieved. To avoid repetition, details are not described herein again.

It should be noted that the electronic device in this embodiment of this application includes the foregoing mobile electronic device.

Figure 9:
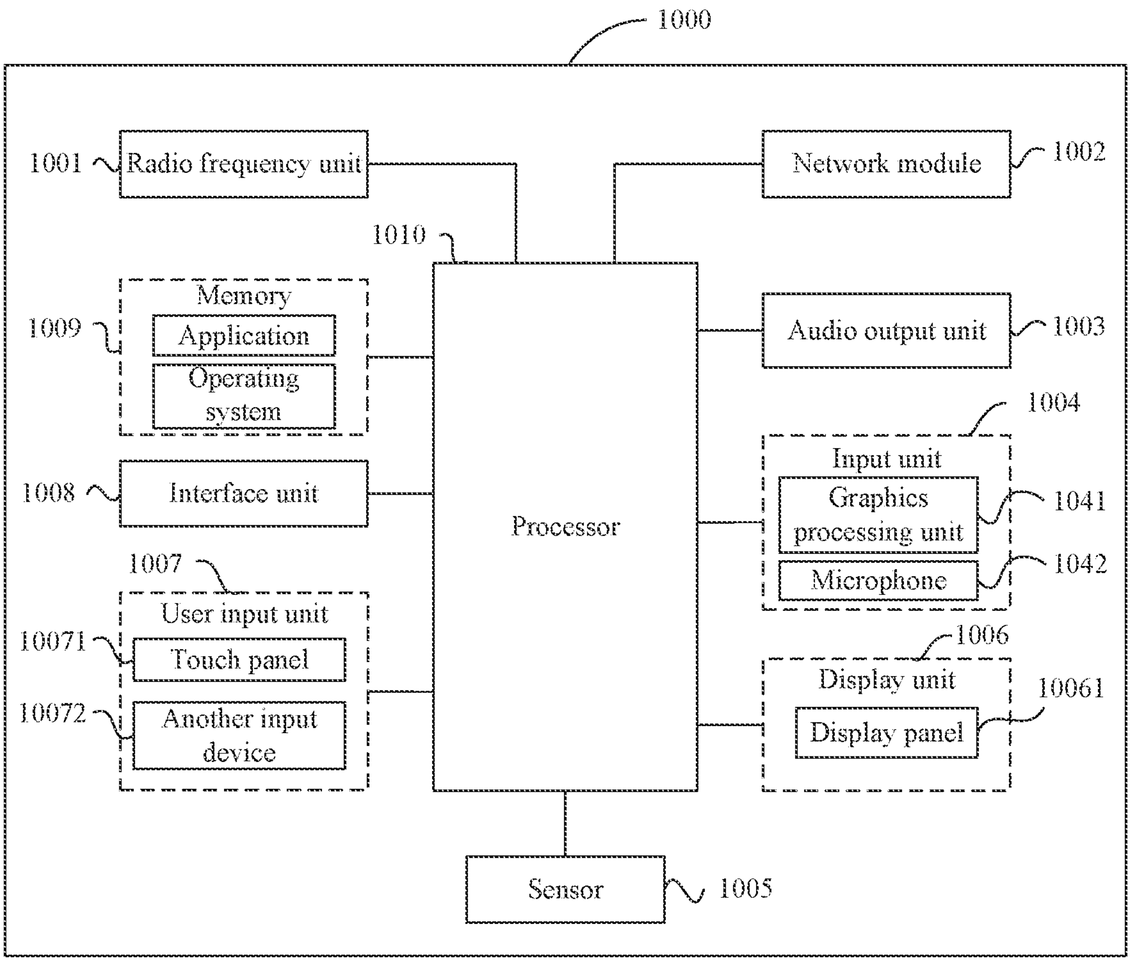
FIG. 9 is a schematic diagram of a hardware structure of an electronic device according to an embodiment of this application.

FIG. 9 is a schematic diagram of a hardware structure of an electronic device according to an embodiment of this application.

An electronic device 1000 includes but is not limited to components, such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (for example, a battery) that supplies power to each component. The power supply may be logically connected to the processor 1010 by using a power supply management system, to implement functions such as charging and discharging management, and power consumption management by using the power supply management system. The structure of the electronic device shown in FIG. 9 does not constitute a limitation on the electronic device. The electronic device may include components more or fewer than those shown in the diagram, a combination of some components, or different component arrangements. Details are not described herein.

The processor 1010 is configured to: detect communication quality of a 5G communication service of a mobile terminal in a first cell, where the mobile terminal supports a 5G capability in the non-standalone NSA mode and reports 5G capability support to the first cell;

if the communication quality of the 5G communication service is less than a preset indicator, detect an abnormality of the 5G communication service in the first cell;

if the abnormality exists in the 5G communication service in the first cell, obtain, from an available neighboring cell corresponding to the first cell, a second cell supporting the 5G communication service; and when the second cell exists, hand over an access cell of the mobile terminal from the first cell to the second cell and report the 5G capability support.

In this embodiment of this application, the communication quality of the 5G communication service of the mobile terminal in the access cell is first detected; when the communication quality is less than the preset indicator, the 5G communication service in the cell is further detected; and when the 5G communication service in the cell is abnormal, another cell that also supports the 5G communication service is obtained and a handover is performed to the another cell. Therefore, when LTE network communication in an NSA anchor cell is abnormal, a specific abnormality of a specific base station can be accurately identified, and the abnormal cell can be left in a timely manner and a handover is performed to a cell in which normal 5G communication can be performed, to avoid a service delay or a service interruption and improve communication fluency in the NSA mode. Accordingly, stability and user experience of the communication service of the mobile terminal are improved.

Optionally, the processor 1010 is further configured to: before detecting the abnormality of the 5G communication service in the first cell, obtain a network configuration parameter of the first cell;

determine, based on the network configuration parameter, whether the first cell is an abnormal cell; and if yes, perform the step of detecting an abnormality of the 5G communication service in the first cell.

Therefore, the mobile terminal may perform cell abnormality detection based on a cell configuration and network transmission, thereby accurately detecting the abnormality of the 5G communication service in the first cell.

Optionally, the processor 1010 is further configured to: if the second cell or the available neighboring cell does not exist, disable the 5G capability support of the mobile terminal and perform reporting to the first cell; and hand over the 5G capability support of the mobile terminal to 4G capability support. When the mobile terminal leaves the first cell, it is determined whether leaving duration exceeds second preset duration. If yes, the 5G capability support of the mobile terminal is enabled and the 5G capability support is reported to a corresponding access cell.

Therefore, the 5G capability support of the mobile terminal is enabled and disabled, so that a configuration of an abnormal base station can be effectively adjusted, to provide a stable and reliable communication service for the mobile terminal.

In addition, in an embodiment, the processor 1010 is configured to: detect communication quality of a 5G communication service of a mobile terminal in a first cell, where the mobile terminal supports a 5G capability in a non-standalone NSA mode and reports 5G capability support to the first cell;

if the communication quality of the 5G communication service is less than a preset indicator, detect an abnormality of the 5G communication service in the first cell;

if the abnormality exists in the 5G communication service in the first cell, disable the 5G capability support of the mobile terminal and perform reporting to the first cell; and hand over the 5G capability support of the mobile terminal to 4G capability support.

In this embodiment of this application, the communication quality of the 5G communication service of the mobile terminal in the access cell is first detected; when the communication quality is less than the preset indicator, the 5G communication service in the cell is further detected; and when the 5G communication service in the cell is abnormal, supporting 5G is directly stopped and a handover is performed to 4G communication. Therefore, when LTE network communication in an NSA anchor cell is abnormal, a specific abnormality of a specific base station can be accurately identified, and 5G communication in an abnormal cell is handed over to normal 4G communication in a timely manner, to avoid a service delay or a service interruption and improve stability and user experience of the communication service of the mobile terminal.

It should be understood that, in this embodiment of this application, the input unit 1004 may include a graphics processing unit (GPU) 10041 and a microphone 10042, and the graphics processing unit 10041 processes image data of a still picture or a video obtained by an image capture apparatus (such as a camera) in a video capture mode or an image capture mode. The display unit 1006 may include a display panel 10061. Optionally, the display panel 10061 may be configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein. The memory 1009 may be configured to store a software program and various data, including but not limited to an application program and an operating system. An application processor and a modem processor may be integrated into the processor 1010, the application processor mainly processes an operating system, a user interface, an application program, and the like, and the modem processor mainly processes wireless communication. It can be understood that, alternatively, the modem processor may not be integrated into the processor 1010.

An embodiment of this application further provides a readable storage medium. The readable storage medium stores a program or an instruction. When the program or the instruction is executed by a processor, each process of the foregoing embodiment of the communication method in the NSA mode is implemented, and a same technical effect is achieved. To avoid repetition, details are not described herein again.

The processor is a processor in the electronic device in the foregoing embodiment. The readable storage medium includes a computer-readable storage medium such as a read-only memory (ROM), a random access memory (RAM), a magnetic disk, an optical disc, or the like.

An embodiment of this application further provides a chip. The chip includes a processor and a communications interface, the communications interface is coupled to the processor, and the processor is configured to run a program or an instruction to implement each process of the foregoing embodiment of the communication method in the NSA mode, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A communication method in a non-standalone (NSA) mode, comprising:

detecting communication quality of a 5G communication service of a mobile terminal in a first cell, wherein the mobile terminal supports a 5G capability in the non-standalone (NSA) mode and reports 5G capability support to the first cell;

when the communication quality of the 5G communication service is less than a preset indicator, detecting an abnormality of the 5G communication service in the first cell;

when the abnormality exists in the 5G communication service in the first cell, obtaining, from an available neighboring cell corresponding to the first cell, a second cell supporting the 5G communication service; and when the second cell exists, handing over an access cell of the mobile terminal from the first cell to the second cell and reporting the 5G capability support;

wherein the detecting communication quality of a 5G communication service of a mobile terminal in a first cell comprises:

determining whether the mobile terminal is in a 5G communication service state;

when the mobile terminal is in the 5G communication service state, detecting a quantity of times the mobile terminal receives a lagging 5G communication service within a preset time; and if the quantity of times is greater than a preset threshold, detecting that the communication quality of the 5G communication service is less than the preset indicator.

2. A chip, wherein the chip comprises a processor and a communication interface, the communication interface is coupled to the processor, and the processor is configured to run a program or an instruction to implement the method according to claim 1.

3. The communication method according to claim 1, wherein the detecting an abnormality of the 5G communication service in the first cell comprises:

determining whether the first cell responds to a data transmission request of the mobile terminal; and when the first cell does not respond to the data transmission request of the terminal, detecting that the abnormality exists in the 5G communication service in the first cell; or determining whether packet data convergence protocol (PDCP) sequence numbers of the first cell are consecutive; and when the PDCP sequence numbers are inconsecutive, detecting that the abnormality exists in the 5G communication service in the first cell.

4. The communication method according to claim 3, before the detecting an abnormality of the 5G communication service in the first cell, further comprising:

obtaining a network configuration parameter of the first cell;

determining, based on the network configuration parameter, whether the first cell is an abnormal cell; and if yes, performing the step of detecting an abnormality of the 5G communication service in the first cell.

5. The communication method according to claim 4, wherein the determining, based on the network configuration parameter, whether the first cell is an abnormal cell comprises:

determining whether a PDCP entity of the first cell is configured in a new radio (NR) mode or whether the PDCP sequence number meets a preset format;

if the PDCP entity of the first cell is configured in the NR mode and the PDCP sequence number meets the preset format, determining whether the first cell is configured with NR measurement or whether the mobile terminal registers the NSA mode with the first cell; and if the first cell is not configured with the NR measurement and the mobile terminal does not register the NSA mode with the first cell, determining that the first cell is the abnormal cell.

6. The communication method according to claim 1, after the obtaining, from an available neighboring cell corresponding to the first cell, a second cell supporting the 5G communication service, further comprising:

if the mobile terminal camps on the first cell, triggering a connected-state radio link failure, or getting offline in an idle state and re-registering with the second cell, to prohibit the mobile terminal from registering with the first cell.

7. The communication method according to claim 1, wherein if the second cell or the available neighboring cell does not exist, disabling the 5G capability support of the mobile terminal and performing reporting to the first cell; and handing over the 5G capability support of the mobile terminal to 4G capability support.

8. The communication method according to claim 7, further comprising:

when the mobile terminal leaves the first cell, determining whether leaving duration exceeds second preset duration; and if yes, enabling the 5G capability support of the mobile terminal and reporting the 5G capability support to a corresponding access cell.

9. An electronic device, comprising a processor, a memory, and a program or an instruction stored in the memory and capable of running on the processor, wherein the program or the instruction, when executed by the processor, causes the electronic device to perform:

detecting communication quality of a 5G communication service of a mobile terminal in a first cell, wherein the mobile terminal supports a 5G capability in the non-standalone (NSA) mode and reports 5G capability support to the first cell;

when the communication quality of the 5G communication service is less than a preset indicator, detecting an abnormality of the 5G communication service in the first cell;

when the abnormality exists in the 5G communication service in the first cell, obtaining, from an available neighboring cell corresponding to the first cell, a second cell supporting the 5G communication service; and when the second cell exists, handing over an access cell of the mobile terminal from the first cell to the second cell and reporting the 5G capability support;

wherein when detecting communication quality of a 5G communication service of a mobile terminal in a first cell, the program or the instruction, when executed by the processor, causes the electronic device to perform:

determining whether the mobile terminal is in a 5G communication service state;

when the mobile terminal is in the 5G communication service state, detecting a quantity of times the mobile terminal receives a lagging 5G communication service within a preset time; and if the quantity of times is greater than a preset threshold, detecting that the communication quality of the 5G communication service is less than the preset indicator.

10. The electronic device according to claim 9, wherein after the obtaining, from an available neighboring cell corresponding to the first cell, a second cell supporting the 5G communication service, the program or the instruction, when executed by the processor, causes the electronic device to further perform:

if the mobile terminal camps on the first cell, triggering a connected-state radio link failure, or getting offline in an idle state and re-registering with the second cell, to prohibit the mobile terminal from registering with the first cell.

11. The electronic device according to claim 9, wherein when detecting an abnormality of the 5G communication service in the first cell, the program or the instruction, when executed by the processor, causes the electronic device to perform:

determining whether the first cell responds to a data transmission request of the mobile terminal; and when the first cell does not respond to the data transmission request of the terminal, detecting that the abnormality exists in the 5G communication service in the first cell; or determining whether packet data convergence protocol (PDCP) sequence numbers of the first cell are consecutive; and when the PDCP sequence numbers are inconsecutive, detecting that the abnormality exists in the 5G communication service in the first cell.

12. The electronic device according to claim 11, wherein before the detecting an abnormality of the 5G communication service in the first cell, the program or the instruction, when executed by the processor, causes the electronic device to further perform:

obtaining a network configuration parameter of the first cell;

determining, based on the network configuration parameter, whether the first cell is an abnormal cell; and if yes, performing the step of detecting an abnormality of the 5G communication service in the first cell.

13. The electronic device according to claim 12, wherein when determining, based on the network configuration parameter, whether the first cell is an abnormal cell, the program or the instruction, when executed by the processor, causes the electronic device to perform:

determining whether a PDCP entity of the first cell is configured in a new radio (NR) mode or whether the PDCP sequence number meets a preset format;

if the PDCP entity of the first cell is configured in the NR mode and the PDCP sequence number meets the preset format, determining whether the first cell is configured with NR measurement or whether the mobile terminal registers the NSA mode with the first cell; and if the first cell is not configured with the NR measurement and the mobile terminal does not register the NSA mode with the first cell, determining that the first cell is the abnormal cell.

14. The electronic device according to claim 9, wherein if the second cell or the available neighboring cell does not exist, disabling the 5G capability support of the mobile terminal and performing reporting to the first cell; and handing over the 5G capability support of the mobile terminal to 4G capability support.

15. The electronic device according to claim 14, wherein the program or the instruction, when executed by the processor, causes the electronic device to further perform:

when the mobile terminal leaves the first cell, determining whether leaving duration exceeds second preset duration; and if yes, enabling the 5G capability support of the mobile terminal and reporting the 5G capability support to a corresponding access cell.

16. A non-transitory readable storage medium, wherein the non-transitory readable storage medium stores a program or an instruction, wherein the program or the instruction, when executed by a processor, causes the processor to perform:

detecting communication quality of a 5G communication service of a mobile terminal in a first cell, wherein the mobile terminal supports a 5G capability in the non-standalone (NSA) mode and reports 5G capability support to the first cell;

when the communication quality of the 5G communication service is less than a preset indicator, detecting an abnormality of the 5G communication service in the first cell;

when the abnormality exists in the 5G communication service in the first cell, obtaining, from an available neighboring cell corresponding to the first cell, a second cell supporting the 5G communication service; and when the second cell exists, handing over an access cell of the mobile terminal from the first cell to the second cell and reporting the 5G capability support;

wherein when detecting communication quality of a 5G communication service of a mobile terminal in a first cell, the program or the instruction, when executed by the processor, causes the processor to perform:

determining whether the mobile terminal is in a 5G communication service state;

when the mobile terminal is in the 5G communication service state, detecting a quantity of times the mobile terminal receives a lagging 5G communication service within a preset time; and if the quantity of times is greater than a preset threshold, detecting that the communication quality of the 5G communication service is less than the preset indicator.

17. The non-transitory readable storage medium according to claim 16, wherein when detecting an abnormality of the 5G communication service in the first cell, the program or the instruction, when executed by the processor, causes the processor to perform:

determining whether the first cell responds to a data transmission request of the mobile terminal; and when the first cell does not respond to the data transmission request of the terminal, detecting that the abnormality exists in the 5G communication service in the first cell; or determining whether packet data convergence protocol (PDCP) sequence numbers of the first cell are consecutive; and when the PDCP sequence numbers are inconsecutive, detecting that the abnormality exists in the 5G communication service in the first cell.

18. The non-transitory readable storage medium according to claim 17, wherein before the detecting an abnormality of the 5G communication service in the first cell, the program or the instruction, when executed by the processor, causes the processor to further perform:

obtaining a network configuration parameter of the first cell;

determining, based on the network configuration parameter, whether the first cell is an abnormal cell; and if yes, performing the step of detecting an abnormality of the 5G communication service in the first cell.

19. The non-transitory readable storage medium according to claim 18, wherein when determining, based on the network configuration parameter, whether the first cell is an abnormal cell, the program or the instruction, when executed by the processor, causes the processor to perform:

determining whether a PDCP entity of the first cell is configured in a new radio (NR) mode or whether the PDCP sequence number meets a preset format;

if the PDCP entity of the first cell is configured in the NR mode and the PDCP sequence number meets the preset format, determining whether the first cell is configured with NR measurement or whether the mobile terminal registers the NSA mode with the first cell; and if the first cell is not configured with the NR measurement and the mobile terminal does not register the NSA mode with the first cell, determining that the first cell is the abnormal cell.

20. The non-transitory readable storage medium according to claim 16, wherein after the obtaining, from an available neighboring cell corresponding to the first cell, a second cell supporting the 5G communication service, the program or the instruction, when executed by the processor, causes the processor to further perform:

if the mobile terminal camps on the first cell, triggering a connected-state radio link failure, or getting offline in an idle state and re-registering with the second cell, to prohibit the mobile terminal from registering with the first cell.

* * * * *